(12) United States Patent
Yasuda et al.

(10) Patent No.: US 8,967,712 B2
(45) Date of Patent: Mar. 3, 2015

(54) SKIN FOR SEAT BACK OF VEHICLE SEAT

(75) Inventors: Ryo Yasuda, Kariya (JP); Toshio Sakai, Toyota (JP); Shinobu Fujisawa, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 919 days.

(21) Appl. No.: 12/581,537

(22) Filed: Oct. 19, 2009

(65) Prior Publication Data
US 2010/0102601 A1    Apr. 29, 2010

(30) Foreign Application Priority Data
Oct. 29, 2008 (JP) ................................. 2008-278264

(51) Int. Cl.
| A47C 7/02 | (2006.01) |
| B60N 2/58 | (2006.01) |
| B60R 7/00 | (2006.01) |
| B60R 11/00 | (2006.01) |
| B60R 13/02 | (2006.01) |

(52) U.S. Cl.
CPC . B60N 2/58 (2013.01); B60R 7/005 (2013.01); B60R 2011/0015 (2013.01); B60R 2011/0075 (2013.01); B60R 2013/0287 (2013.01)
USPC ................. 297/188.04; 297/452.62

(58) Field of Classification Search
USPC ................. 297/188.04, 188.07, 218.1, 219.1, 297/452.58, 452.62
See application file for complete search history.

(56) References Cited

U.S. PATENT DOCUMENTS

| 3,479,085 A * | 11/1969 | Weinstein ................... 297/228.1 |
| 3,749,441 A * | 7/1973 | Bini .............................. 297/223 |
| 4,518,198 A * | 5/1985 | Daniels ......................... 297/229 |
| D313,695 S * | 1/1991 | Mawhinney et al. ........ D12/422 |
| 5,004,295 A * | 4/1991 | Inoue ....................... 297/188.07 |
| 5,295,732 A * | 3/1994 | Boisset ...................... 297/452.1 |
| 7,469,962 B2 * | 12/2008 | Paulin .......................... 297/229 |

FOREIGN PATENT DOCUMENTS

| JP | 2005-152513 | 6/2005 |
| JP | 2005-205993 | 8/2005 |

OTHER PUBLICATIONS

English language Abstract of JP 2005-205993, Aug. 4, 2005.
English language Abstract of JP 2005-152513, Jun. 16, 2005.

* cited by examiner

*Primary Examiner* — Philip Gabler
(74) *Attorney, Agent, or Firm* — Greenblum & Bernstein, P.L.C.

(57) ABSTRACT

A skin for a seat back of a vehicle seat includes a rear upper piece arranged on the upper rear surface of the seat back, and a rear lower piece arranged on the lower rear surface of the seat back. The rear upper piece has a rear upper piece pocket portion that extends downward in front of the rear lower piece. A left end portion, a right end portion, and a lower end portion of the rear upper piece pocket portion are sewn to the rear lower piece to form a pocket, and an opening of the pocket is formed between the upper end portion of the rear upper piece pocket portion and the rear lower piece. The rear upper piece and the rear lower piece are sewn together at a seam that extends laterally from the opening of the pocket.

5 Claims, 6 Drawing Sheets

SKIN FOR SEAT BACK OF VEHICLE SEAT

INCORPORATION BY REFERENCE

The disclosure of Japanese Patent Application No. 2008-278264 filed on Oct. 29, 2008 including the specification, drawings and abstract is incorporated herein by reference in its entirety.

BACKGROUND OF THE INVENTION

1. Field of the Invention

The invention relates to skin for a seat back of a vehicle seat mounted in a vehicle such as an automobile.

2. Description of the Related Art

A vehicle seat typically has a seat cushion on which a user sits, and a seat back that stands upright at the rear portion of the seat cushion. The seat cushion and the seat back each have a pad formed of resin foam, and a skin that covers the pad. Conventionally, a pocket arranged on the rear surface of the seat back may be formed on the skin of the seat back (see Japanese Patent Application Publication No. 2005-152513 (JP-A-2005-152513) and Japanese Patent Application Publication No. 2005-205993 (JP-A-2005-205993)). This type of skin has a rear surface piece arranged on the rear surface of the seat back, and a pocket piece that is attached to a lower portion of the rear surface of the rear surface piece. The pocket is formed by the lower end portion and the left and right end portions of the pocket piece being sewn to the rear surface piece.

However, when force is applied to the pocket, e.g., when force to open the pocket or the weight of an object carried in the pocket is applied to the pocket, most of that force is applied to the upper end portion of the seam of the pocket piece and the rear surface piece. Therefore, it is desirable to distribute the force applied to the pocket in order to increase the strength of the pocket. Thus, the invention provides a skin for a seat back having an extremely strong pocket.

SUMMARY OF THE INVENTION

A first aspect of the invention relates to a skin for a seat back of a vehicle seat that has a pocket arranged on a rear surface of the seat back. This skin includes a rear upper piece arranged on the upper rear surface of the seat back, and a rear lower piece arranged on the lower rear surface of the seat back. The rear upper piece has a rear upper piece pocket portion that extends downwards in front of the rear lower piece, which is the back side of the rear lower piece. A left end portion, a right end portion, and a lower end portion of the rear upper piece pocket portion are sewn to the rear lower piece to form the pocket, and an opening of the pocket is formed between the upper end portion of the rear upper piece pocket portion and the rear lower piece. The rear upper piece and the rear lower piece are sewn together at a seam that extends laterally from the opening of the pocket.

Therefore, the pocket is formed by the rear upper piece and the rear lower piece. Thus, when force is applied to the pocket, e.g., when force to open the opening or the weight of an object carried in the pocket is applied to the pocket, that force is applied to the rear upper piece and the rear lower piece. Also, the rear upper piece and the rear lower piece are sewn together at the seam which extends laterally from the opening of the pocket. Therefore, force that is applied to the pocket can be supported laterally (horizontally) by the seam, as well as vertically by the seams on the left and right end portions of the pocket.

Therefore, force that is applied to the pocket is able to be supported by the rear upper piece and the rear lower piece, and dispersed and supported by the seams that extend horizontally and vertically. Thus, the strength of the pocket can be increased. Further, the horizontal seam is positioned in generally the same line as the opening of the pocket, which enables the design of that seam to be enhanced. Also, the pocket is able to be made with relatively few parts because it is formed by the rear upper piece and the rear lower piece.

In the aspect described above, the rear lower piece may include a piece main body and a rear lower piece pocket portion that is folded back from the upper end portion of the piece main body so as to extend in front of the piece main body. Also, the pocket may be formed by the rear lower piece pocket portion being sewn to the rear upper piece pocket portion. Accordingly, the pocket is formed in a pouch shape separate from the piece main body, and is arranged in front of the piece main body. Therefore, the pocket and objects carried in the pocket are able to be protected from damage by the piece main body of the rear lower piece.

In the structure described above, an interlining may be sewn to the upper end portion of the rear surface of the rear lower piece pocket portion, along that upper end portion. The opening of the pocket is able to be reinforced by this interlining. Also, the interlining is sewn to the rear lower piece pocket portion, and that seam and the interlining are arranged in front of the piece main body of the rear lower piece. Therefore, neither the seam nor the interlining is able to be seen on the surface (i.e., from the outside), so they do not detract from the design.

Also, the left and right end edges of the rear upper piece and the rear lower piece may be arranged in positions that generally correspond to the left and right end edges, respectively, of the rear surface of the seat back. Further, the seam of the rear upper piece and the rear lower piece may be set in the same line, which extends generally laterally, as the opening of the pocket. According to this structure, the seams of the side pieces that can be formed at the left and right end portions of the rear upper piece and the rear lower piece are not formed on the rear surface of the seat back. Also, the seams that form the pocket are unable to be seen on the surface (i.e., from the outside). Moreover, the seam of the rear upper piece and the rear lower piece is positioned in the same straight line as the opening of the pocket. As a result, these structures enhance the design of the skin. Moreover, the width of both the rear upper piece and the rear lower piece in the horizontal direction is generally the same as the width of the seat back in the horizontal direction, so the pocket can easily be made wide in the horizontal direction, or the horizontal position of the pocket can easily be adjusted.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
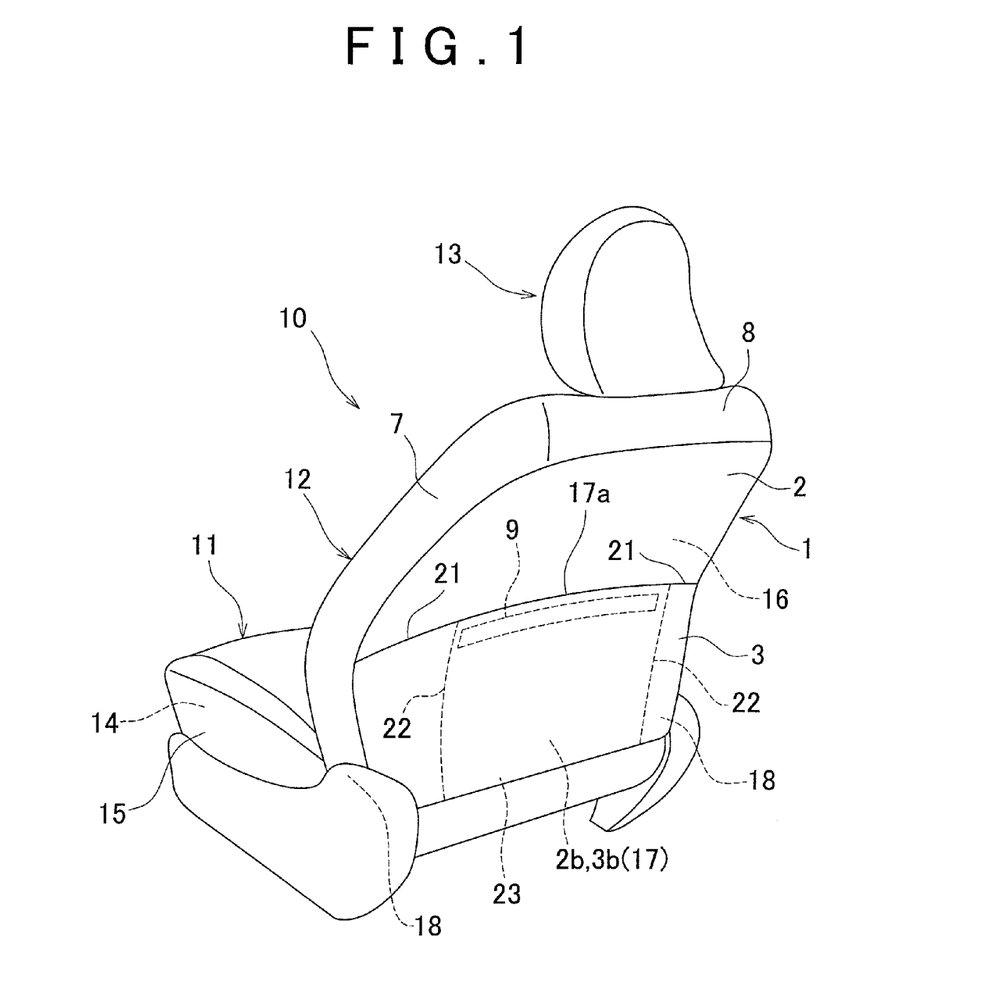
FIG. 1 shows a perspective view of a seat from behind.
Figure 2:
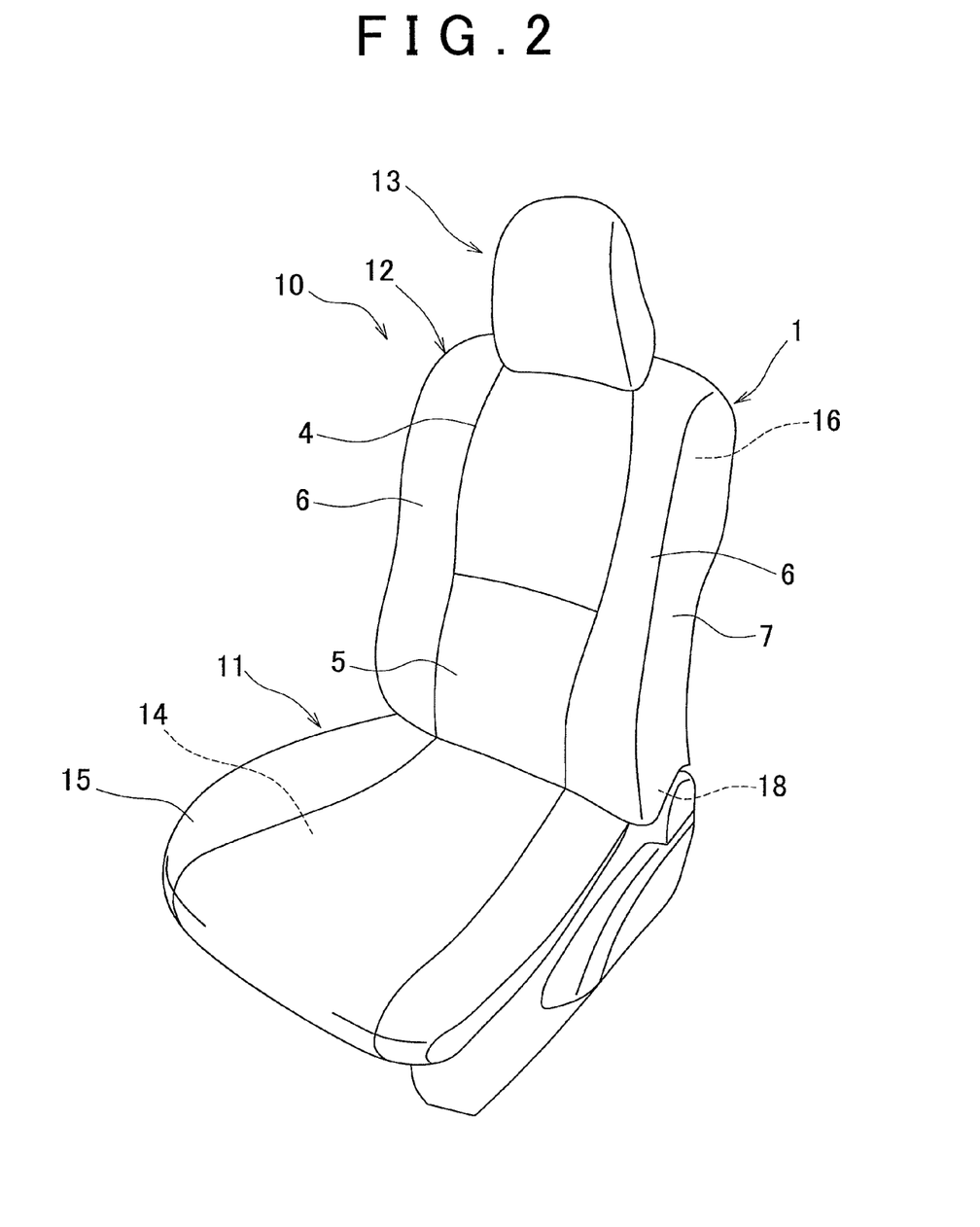
FIG. 2 shows a perspective view of the seat from the front.

Example embodiments of the present invention will be described in greater detail below with reference to FIGS. 1 to 6. A seat 10 is a vehicle seat that is mounted to the floor of a vehicle such as an automobile. This seat 10 has a seat cushion 11 and a seat back 12 which stands upright at a rear portion of the seat cushion 11, as shown in FIGS. 1 and 2. A reclining device 18 is provided between the seat cushion 11 and the seat back 12. This reclining device 18 connects the seat back 12 to the seat cushion 11 in such a manner that enables the angle of the seat back 12 with respect to the seat cushion 11 to be adjusted. The seat cushion 11 and the seat back 12 each have a pad 14 and 16, and a skin 15 and 1 that covers the pad 14 and 16.

Each of the pads 14 and 16 is formed of resin foam such as polyurethane. The skin 1 and 15 is formed of artificial leather, leather, plastic, or fabric or the like. The skin 1 and 15 includes a plurality of pieces that are sewn together to form the skin 1 and 15. The skin 1 of the seat back 12 has a pocket 17 arranged on the rear surface of the seatback 12.

Figure 3:
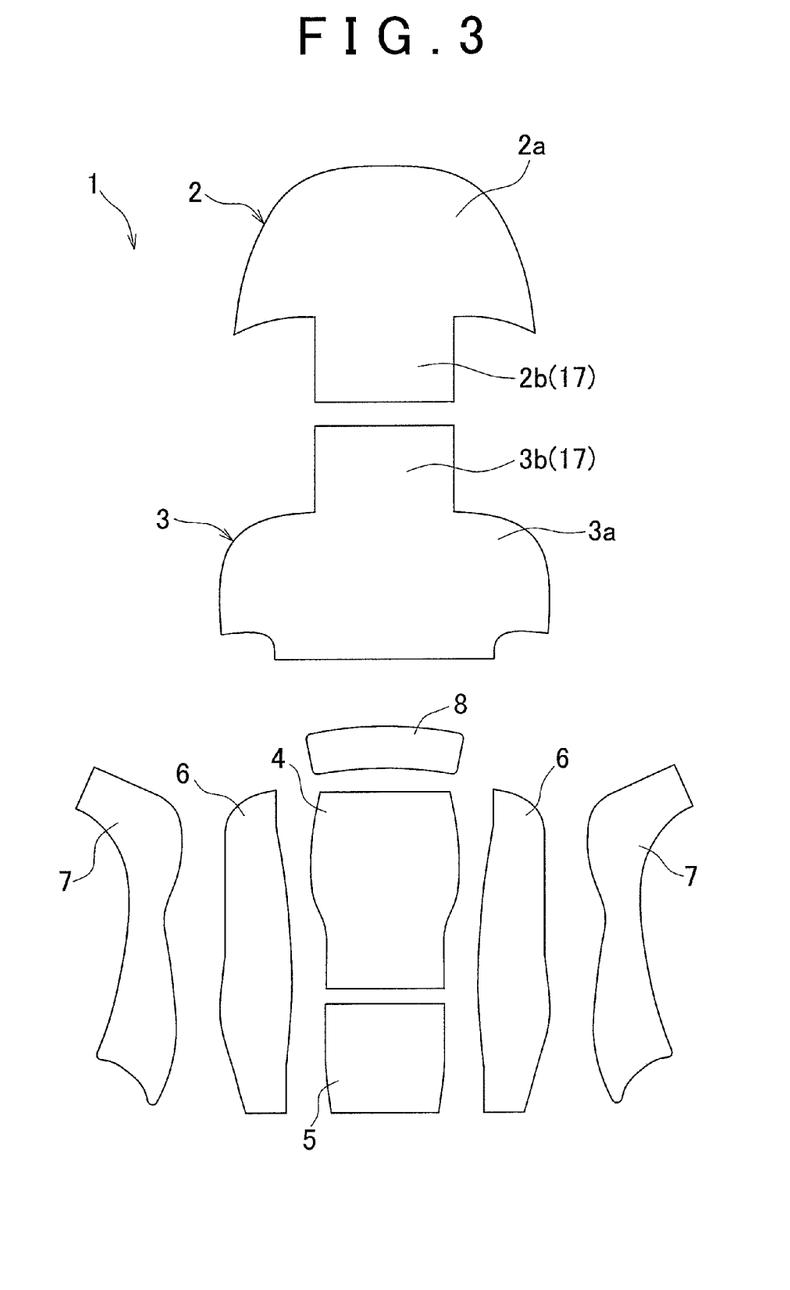
FIG. 3 shows an exploded view of skin.

The skin 1 of the seat back 12 includes a rear upper piece 2 arranged in an upper region on the back of the seat back 12, and a rear lower piece 3 arranged in a lower region on the back of the seat back 12, as shown in FIGS. 1 and 3. The skin 1 includes has a front upper piece 4 arranged in an upper region on the front of the seat back 12, a front lower piece 5 arranged in a lower region on the front of the seat back 12, front side pieces 6 arranged at regions on the left and right sides on the front of the seat back 12, side pieces 7 arranged in regions on the sides of the seat back 12, and an upper piece 8 arranged in an upper region on the seat back 12, as shown in FIGS. 2 and 3.

The rear upper piece 2 includes a piece main body 2a and a rear upper piece pocket portion 2b which extends from the piece main body 2a and is integrated with the piece main body 2a, as shown in FIG. 3. The piece main body 2a has generally the same shape as the rear upper region of the seat back 12. The left and right end edges of the piece main body 2a are set on the rear left and right end edges of the seat back 12. The rear upper piece pocket portion 2b extends from the center of the lower end portion of the piece main body 2a. The lower end of the rear upper piece pocket portion 2b is generally straight. The rear upper piece pocket portion 2b is a member that forms part of the pocket 17. The rear upper piece pocket portion 2b extends from the piece main body 2a in front of, i.e., on the back side of, the rear lower piece 3.

The rear lower piece 3 includes a piece main body 3a and a rear lower piece pocket portion 3b which extends from the piece main body 3a and is integrated with the piece main body 3a, as shown in FIG. 3. The piece main body 3a has generally the same shape as the rear lower region of the seat back 12. The left and right end edges of the piece main body 3a are set on the rear left and right end edges of the seat back 12. The rear lower piece pocket portion 3b extends from the center of the upper end portion of the piece main body 3a. The upper end of the rear lower piece pocket portion 3b is generally straight. The rear lower piece pocket portion 3b is a member that forms part of the pocket 17. The rear lower piece pocket portion 3b is folded over from the upper end portion of the piece main body 3a so that it lies in front of the piece main body 3a.

Figure 4:
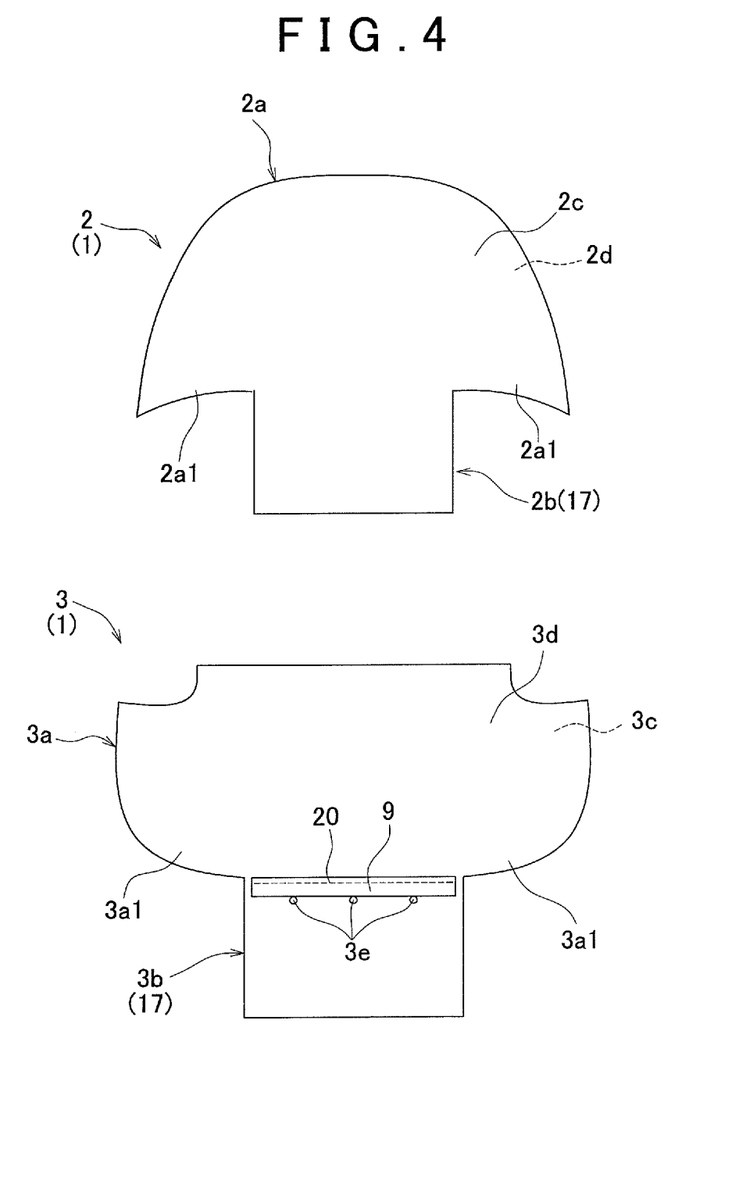
FIG. 4 shows a manufacturing process diagram of the skin.

The method for manufacturing the skin 1 involves first preparing the variously shaped pieces 2 through 8. Next, the rear lower piece 3 is set so that the front side 3d (i.e., the back side or the side that corresponds to the other side of the paper on which FIG. 3 is drawn) is face up and upside down with respect to the rear upper piece 2, as shown in FIG. 4. Then a plurality of marking holes 3e are formed near the upper end portion of the rear lower piece pocket portion 3b. One end edge of an interlining 9 is aligned with these holes 3e, and the interlining 9 is positioned at (i.e., aligned with) the upper end portion of the rear lower piece pocket portion 3b. The interlining 9 is a resin sheet having a predetermined hardness and elasticity, and is sewn onto the rear lower piece pocket portion 3b by machine (thereby creating a seam 20).

Figure 5:
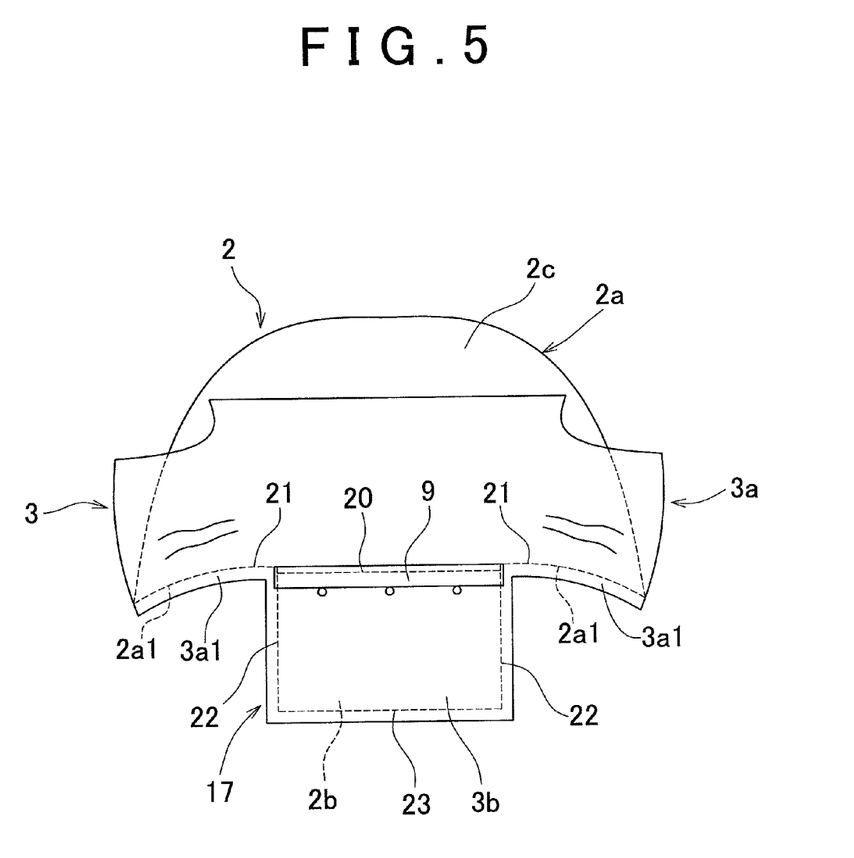
FIG. 5 shows another manufacturing process diagram of the skin.

Next, the rear lower piece 3 is overlaid on the rear upper piece 2, as shown in FIGS. 4 and 5. More specifically, the rear upper piece 2 is arranged in such a manner that the rear surface (i.e., the outer side) 2c is face up and the front surface (i.e., the back side) 2d is face down. Then, the rear lower piece 3 is arranged on top of this rear upper piece 2 in such a manner that the front surface (i.e., the back side) 3d is face up and the rear surface (i.e., the outer side) 3c is face down. Next, an upper edge 3a1 is overlaid on the lower edge 2a1 of the piece main body 2a while a portion of both the rear upper piece 2 and the rear lower piece 3 are folded back. Then, the rear lower piece pocket portion 3b is overlaid on the rear upper piece pocket portion 2b.

Next, as shown in FIG. 5, the upper edge 3a1 of the piece main body 3a and the lower edge 2a1 of the piece main body 2a are sewn together by machine (thereby creating a seam 21). Similarly, the left and right end portions of the rear lower piece pocket portion 3b are sewn to the left and right end portions of the rear upper piece pocket portion 2b (thereby creating seams 22), and the lower end portion of the rear lower piece pocket portion 3b is sewn to the lower end portion of the rear upper piece pocket portion 2b (thereby creating a seam 23). The left and right end portions of the interlining 9 are sewn on at the same time the seams 22 are formed. As a result, the interlining 9 is firmly sewn to the rear lower piece pocket portion 3b. Next, the rear lower piece 3 is inverted downward around the seam 21.

Figure 6:
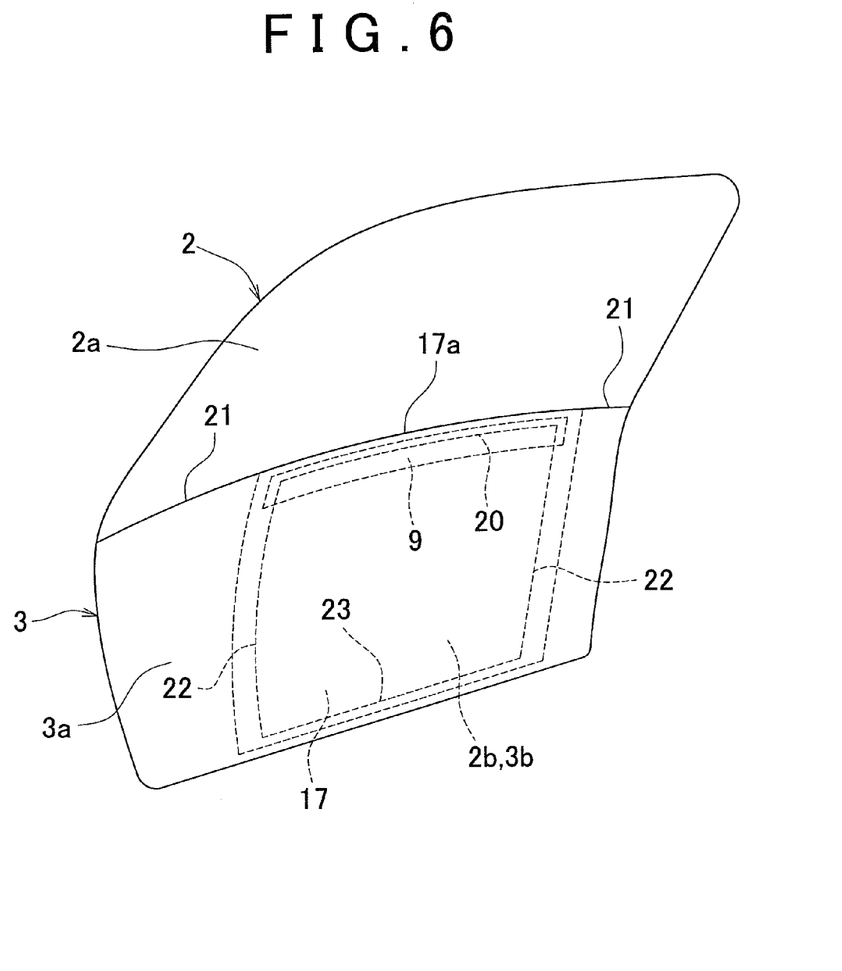
FIG. 6 shows a perspective view of a rear upper piece and a rear lower piece.

The pocket 17 is formed by the rear upper piece pocket portion 2b and the rear lower piece pocket portion 3b, as shown in FIG. 6. The pocket 17 is arranged in front of the piece main body 3a of the rear lower piece 3. This pocket 17 has an opening 17a at the upper end portion, and the interlining 9 is arranged along this opening 17a. The seam 21 of the rear upper piece 2 and the rear lower piece 3 is positioned in generally the same straight line as the opening 17a. The seams 20, 22, and 23 are positioned in front of the piece main body 3a of the rear lower piece 3.

Next, the pieces 5 to 8 are sewn together and the side pieces 7 are sewn to the left and right side portions of the rear upper piece 2 and the rear lower piece 3, thus forming the skin 1. This skin 1 is then fit over the pad 16, with the pocket 17 arranged in the rear lower region of the seat back 12. The seat back 12 has a curved surface in which the rear surface curves forward to avoid the knees of an occupant seated in a rear seat. Meanwhile, the skin 1 has the interlining 9 positioned at the upper end portion of the pocket 17. This interlining 9 keeps the skin 1 so that it follows the curvature of the seat back 12.

As described above, the skin 1 has the rear upper piece 2 and the rear lower piece 3, as shown in FIG. 1. The rear upper piece 2 has the rear upper piece pocket portion 2b that extends downwards in front of, i.e., on the back side of, the rear lower piece 3. The rear upper piece pocket portion 2b is sewn at the right and left end portions, as well as at the lower end portion, to the rear lower piece 3 to form the pocket 17. The opening 17a of the pocket is formed between the upper end portion of the rear upper piece pocket portion 2*b* and the rear lower piece 3. The rear upper piece 2 and the rear lower piece 3 are sewn together at the seam 21 which extends laterally (i.e., to the left and right) from the opening 17*a* of the pocket 17.

Therefore, the pocket 17 is formed by the rear upper piece 2 and the rear lower piece 3. Thus, when force is applied to the pocket 17, e.g., when force to open the opening 17*a* or the weight of an object carried in the pocket is applied to the pocket 17, that force is applied to the rear upper piece 2 and the rear lower piece 3. Also, the rear upper piece 2 and the rear lower piece 3 are sewn together at the seam 21 which extends laterally from the opening 17*a* of the pocket 17. Therefore, force that is applied to the pocket 17 can be supported horizontally (laterally) by the seam 21, as well as vertically by the seams 22 on the left and right end portions of the pocket 17.

Therefore, force that is applied to the pocket 17 is able to be supported by the rear upper piece 2 and the rear lower piece 3, and dispersed and supported by the seams 21 and 22 which extend horizontally and vertically, respectively. Thus, the strength of the pocket 17 can be increased. Further, the horizontal seam 21 is positioned in generally the same line as the opening 17*a* of the pocket 17, which enables the design of that seam 21 to be enhanced. Also, the pocket 17 is able to be made with relatively few parts because it is formed by the rear upper piece 2 and the rear lower piece 3.

Moreover, the rear lower piece 3 includes the piece main body 3*a* and the rear lower piece pocket portion 3*b* that folds back from the upper end portion of the piece main body 3*a* and extends in front of the piece main body 3*a*, as shown in FIGS. 1 and 3. The rear lower piece pocket portion 3*b* is then sewn to the rear upper piece pocket portion 2*b*, thereby forming the pocket 17. Accordingly, the pocket 17 is formed in a pouch shape separate from the piece main body 3*a*, and is arranged in front of the piece main body 3*a*. Therefore, the pocket 17 and objects carried in the pocket 17 are able to be protected from damage by the piece main body 3*a* of the rear lower piece 3.

Also, the interlining 9 is sewn to the upper end portion of the rear surface of the rear lower piece pocket portion 3*b*, along that upper end portion, as shown in FIGS. 4 and 6. Therefore, the opening 17*a* of the pocket 17 is able to be reinforced by this interlining 9. Also, the interlining 9 is sewn to the rear lower piece pocket portion 3*b*, and that seam 20 and the interlining 9 are arranged in front of the piece main body 3*a* of the rear lower piece 3. Therefore, neither the seam 20 nor the interlining 9 is able to be seen on the surface (i.e., from the outside), so they do not detract from the design.

Also, the left and right end edges of the rear upper piece 2 and the rear lower piece 3 are arranged in positions that generally correspond to the rear left and right end edges of the rear surface of the seat back 12, as shown in FIG. 1. The seam 21 of the rear upper piece 2 and the rear lower piece 3 is set in the same line, which extends generally horizontally, as the opening 17*a* of the pocket 17. Therefore, the seams of the side pieces 7 that can be formed on the left and right end portions of the rear upper piece 2 and the rear lower piece 3 are not formed on the rear of the seat back 12. Also, the seams 22 and 23 that form the pocket 17 are unable to be seen on the surface (i.e., from the outside). Further, the seam 21 of the rear upper piece 2 and the rear lower piece 3 is positioned in the same straight line as the opening 17*a* of the pocket 17. As a result, these structures enhance the design of the skin 1. Moreover, the width of both the rear upper piece 2 and the rear lower piece 3 in the horizontal direction is generally the same as the width of the seat back 12 in the horizontal direction, so the pocket 17 can easily be made wide in the horizontal direction, or the horizontal position of the pocket 17 can easily be adjusted.

The invention is not limited to the example embodiment described above, but may also be carried out is various other modes such as those described below.

(1) The skin 1 in the example embodiment described above covers the surface of the pad 16. Alternatively, however, the surface of the pad may be covered by a first skin, and the skin 1 may cover the surface of the first skin in a manner such that the skin 1 is able to be taken off. That is, the skin 1 may be a changeable skin.

(2) The skin 1 in the example embodiment described above includes the rear lower piece pocket portion 3*b*. However, the skin 1 does not have to include the rear lower piece pocket portion 3*b*. Instead, the pocket may be formed by the left, right, and lower end portions of the rear upper piece pocket portion 2*b* being sewn to the piece main body 3*a* of the rear lower piece 3.

(3) The rear upper piece 2 and the rear lower piece 3 in the example embodiment described above have generally the same horizontal widths as the horizontal width of the rear surface of the seat back 12. However, the horizontal widths of the pieces 2 and 3 may alternatively be smaller or greater than the horizontal width of the rear surface of the seat back 12.

What is claimed is:

1. A skin for a seat back of a vehicle seat that has a pocket arranged on a rear surface of the seat back, comprising:
   a rear upper piece arranged on an upper rear surface of the seat back; and
   a rear lower piece arranged on a lower rear surface of the seat back,
   wherein the rear upper piece has a rear upper piece pocket portion that extends downwards so that a rear side face of the rear upper piece pocket portion faces a front side face of the rear lower piece; a left end portion, a right end portion, and a lower end portion of the rear upper piece pocket portion are sewn to the rear lower piece to form the pocket, and an opening of the pocket is formed between an upper end portion of the rear upper piece pocket portion and the rear lower piece; and the rear upper piece and the rear lower piece are sewn together at a seam that extends laterally at the opening of the pocket, and
   wherein the rear lower piece includes a piece main body and a rear lower piece pocket portion that is folded back from an upper end portion of the piece main body so as to extend in front of the piece main body, and the pocket is formed by the rear lower piece pocket portion being sewn to the rear upper piece pocket portion.

2. The skin for the seat back of the vehicle seat according to claim 1, wherein left and right end edges of the rear upper piece and the rear lower piece are arranged in positions that generally correspond to left and right end edges, respectively, of the rear surface of the seat back, and the seam of the rear upper piece and the rear lower piece is set generally in the same line as the opening of the pocket.

3. The skin for the seat back of the vehicle seat according to claim 1, wherein an interlining is sewn to an upper end portion of a rear side surface of the rear lower piece pocket portion, along the upper end portion.

4. The skin for the seat back of the vehicle seat according to claim 3, wherein left and right end edges of the rear upper piece and the rear lower piece are arranged in positions that generally correspond to left and right end edges, respectively, of the rear surface of the seat back, and the seam of the rear upper piece and the rear lower piece is set generally in the same line as the opening of the pocket.

5. The skin for the seat back of the vehicle seat according to claim 1, wherein seams of the left and right end portions of the rear lower piece and the rear upper piece pocket portion are formed independently of seams of the rear lower piece and side pieces, one of which is arranged on each side surface of the seat back.

* * * * *